E. F. W. ALEXANDERSON.
HIGH SPEED ROTATING BODY.
APPLICATION FILED OCT. 8, 1914.
1,208,441.
Patented Dec. 12, 1916.
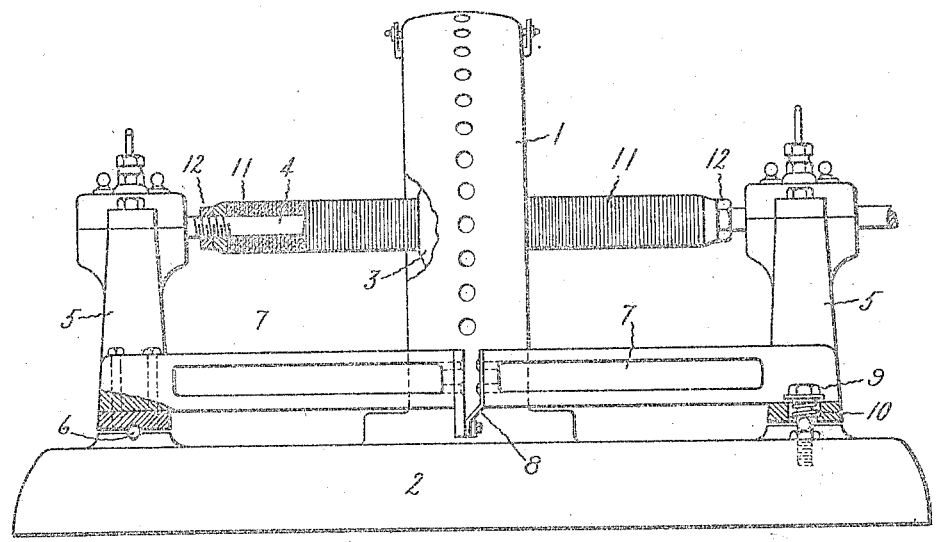
Witnesses:
Inventor:
Ernst F. W. Alexanderson,
by
His Attorney.

UNITED STATES PATENT OFFICE.

ERNST F. W. ALEXANDERSON, OF SCHENECTADY, NEW YORK, ASSIGNOR TO GENERAL ELECTRIC COMPANY, A CORPORATION OF NEW YORK.

HIGH-SPEED ROTATING BODY.

1,208,441.  Specification of Letters Patent.  Patented Dec. 12, 1916.

Application filed October 8, 1914. Serial No. 865,682.

*To all whom it may concern:*

Be it known that I, ERNST F. W. ALEXANDERSON, a citizen of the United States, residing at Schenectady, in the county of Schenectady, State of New York, have invented certain new and useful Improvements in High-Speed Rotating Bodies, of which the following is a specification.

My invention relates to bodies designed for rotation at high speeds, and particularly to shafts rotating at high speeds.

More especially my invention relates to means for damping the vibration of a rotating body, particularly at its critical speed.

The object of my invention is to provide a novel and improved shaft construction particularly adapted for high speed rotation, that is for rotation at or above its critical speed.

Again, the object of my invention is to provide means for preventing or minimizing objectionable vibration of a high speed rotating body, and especially to damp the vibration of a body rotating at high speeds, and particularly at its critical speed.

More particularly the object of my invention is to provide a rotatable shaft construction capable of rotating at high speed without objectionable vibration at its critical speed.

The novel features of my invention which I believe to be patentable are definitely indicated in the claims appended hereto. These novel features together with the construction of an apparatus embodying the same will be understood from the following description taken in connection with the accompanying drawing, in which the figure is a front elevation of a high frequency alternator having a shaft adapted for high speed rotation embodying my invention.

A revolving body rotating at increasingly high speeds will eventually reach a certain speed at which excessive vibration will occur, and this is termed the critical speed. At the critical speed of the rotating body the natural period of vibration of the body resonates with the impulses given the body by its rotating condition. Mechanical resonance, like electrical surges, is possible when a medium exists which can absorb energy and give it back again at a definite rate of pulsation. When the impulses given a rotating body as an effect of its rotation are in time phase with the definite rate of pulsation at which absorbed energy is given back, the body is in a condition of mechanical resonance. Under such conditions the absorbed energy is given back at just the instant the body receives an impulse, and the direction of action of the absorbed energy and of the impulse are the same, hence the body is subjected to a force which is the sum of the forces due to the absorbed energy and to the normal impulse due to rotation, and the sum of these two component forces is an abnormally large force causing excessive bending of the body and consequent vibration. This is what occurs in the case of a rotating body at its critical speed. For the purposes of further explanation assume a body carried by a flexible shaft. Vibration of the shaft is, in effect, a rapid to and fro bending action. When the shaft bends in one direction energy is stored in it because of its resilient character, and this stored up energy tends to unbend or bring back to its normal condition the shaft. At the critical speed this stored up energy is given back at the instant the shaft tends to bend in the opposite direction and an augmented force thus acts to bend the shaft in the latter direction, thereby producing the excessive vibration characteristic of rotation at the critical speed.

A flexible steel shaft is a medium which can absorb energy and give it back again at a definite rate of pulsation, hence the excessive vibration of such a shaft at critical speeds. If a medium can be found which can absorb energy without being able to give it back, vibratory movement will be dead, so to speak, and no critical frequency of pulsation will exist where such a medium is employed in a rotating body. I have found that a mass of laminations held under pressure is such a medium as can absorb energy without being able to give it back. Experiments have shown that such a mass of laminations may be subjected to a certain amount of compression, thereby absorbing energy, but that a negligible amount of this absorbed energy is given back, due to what may be called mechanical hysteresis. A rotating body made entirely or in part of a material or mass having mechanical hysteresis will not exhibit excessive vibration at otherwise critical speeds of rotation of the body. In applying my invention to a flexible shaft, I surround the shaft with a mass of laminations held together under pressure. The mass of laminations have a damping effect on any vibration and thereby prevent the development of any critical speed.

The figure of the drawing illustrates a high frequency alternator of the type described in my prior U. S. Patents 1,008,577, dated Nov. 14, 1911, and 1,110,030, dated Sept. 8, 1914. While I have chosen this particular type of machine to illustrate the principle of my present invention, it will of course be understood that the invention is in no sense limited to this particular machine, but is applicable to any machine in which excessive or objectionable vibration of the rotatable member is encountered at critical speeds.

The high frequency alternator of the figure of the drawings comprises a stator 1 supported by a base 2. A rotor 3 is carried intermediate the ends and near the center of a long flexible steel shaft 4. The shaft is mounted in suitable self-alining bearings carried by pillow blocks 5. Each pillow block is mounted for angular movement about a cylindrical rod 6 positioned in a V-shaped groove in the base 2. To insure equal angular movement upon an expansion of the shaft, the pillow blocks are connected by beams 7 and a flat spring 8. Bolts 9 are screwed into the base 2 and bear against the beams through compression springs 10, and thereby hold the pillow blocks, to which the beams are secured, firmly pressed on the bearing rods 6 but permit the desired slight angular movement of the pillow blocks about these rods as pivots.

In accordance with my present invention, the shaft 4 is surrounded on each side of the rotor with a mass of circular laminations 11. The laminated mass may be made up of laminations of iron or any other suitable material. The laminations are strung on the shaft and are forced toward the rotor and held together under pressure by a suitable lock-nut combination 12. The mass of laminations mounted on the flexible shaft impart to the shaft as an entity the characteristics of a medium which can absorb energy but which cannot give back the energy absorbed. In the bending of the shaft in one direction during a vibratory action, the laminations will be compressed on one side of the shaft and spread apart on the other side. Assume, for example, that the shaft is bent upwardly out of its normal axis of alinement. The laminated mass below the shaft will be compressed while the laminated mass above the shaft will be slightly expanded. Energy is absorbed in the compression of the laminated mass, but when the shaft bends in the opposite direction, that is downwardly, this energy is not given back. The energy absorbed by the laminated mass appears as heat and is not available to produce mechanical resonance of the shaft. The mass of laminations impart to the rotating body the characteristic of mechanical hysteresis, as a result of which the energy of vibration is absorbed and dissipated. The laminated mass thus acts as a damping medium to damp the to and fro movement of the shaft, and thus effectively prevents objectionable vibration of the shaft at all speeds and the development of any critical speed.

It will be seen from the foregoing explanation and description that I have provided a body adapted for rotation at high speeds, that is at or above its ordinary critical speed, with means for damping vibration of the body and hence for preventing the occurrence of any actual critical speed. This means comprises a medium adapted to absorb energy imparted thereto by a vibratory tendency of the body but unable to give such absorbed energy back again to increase the vibratory tendency. As heretofore stated, a body rotating at increasingly high speeds has a tendency to vibrate excessively at certain speeds. By the application of my invention excessive vibration of the body is prevented, and hence the body cannot be said to possess any actual critical speed at which the vibration is objectionable. Since it is generally only necessary to reduce the vibration to an unobjectionable amount, that is to prevent excessive vibration, the damping of the vibration will usually consist of a minimizing or reduction of the vibration at the ordinary critical speed, but obviously the damping may amount to an entire elimination of the vibration.

I have in the appended claims defined the rotatable body as adapted to rotate at or above its critical speed. Where the vibration of a rotating body is damped, as by the application of my present invention, the body in a strict literal sense has no actual critical speed. I have employed the expression critical speed in this connection, however, to denote a condition of high speed rotation such that excessive vibration of the body would occur if the principle of my invention were not made use of. The critical speed of the rotatable body defined in the claims thus signifies generally a very high speed of rotation, and more particularly such a high speed of rotation that excessive vibration would occur with the ordinary present day practice in the construction of such body.

I have explained my invention by illustrating and describing a certain specific embodiment thereof, but it will be readily understood by those skilled in the art that the invention may be embodied in many other forms than that shown and described. I accordingly, do not wish to be restricted to the particular form and construction disclosed herein by way of example for the purpose of setting forth my invention in accordance with the patent statutes. The terms of the appended claims are, therefore, not restricted to the precise structure disclosed, but are intended to cover all changes and modifications within the spirit and scope of my invention.

What I claim as new and desire to secure by Letters Patent of the United States, is:—

1. The combination with a rotatable shaft adapted to rotate at or above its critical speed, of means for damping the vibration of the shaft, said means being secured to said shaft and relatively fixed with respect thereto.

2. A rotatable body adapted to rotate at or above its critical speed, said body including a mass of laminations held together under pressure and adapted to damp the vibration of the body.

3. The combination with a shaft adapted to rotate at or above its critical speed, of a mass of laminations held together under pressure and operatively related to the shaft and adapted to damp the vibration of the shaft.

4. A rotatable body adapted to rotate at or above its critical speed, said body including a medium adapted to absorb energy imparted thereto by a vibratory tendency of the body but unable to give such absorbed energy back again to increase the vibratory tendency.

5. A rotatable body adapted to rotate at or above its critical speed comprising a mass of laminations held together under pressure and adapted to absorb energy imparted thereto by a vibratory tendency of the body but unable to give such absorbed energy back again to increase the vibratory tendency.

6. The combination with a rotatable shaft adapted to rotate at or above its critical speed, of a medium operatively related thereto and capable of absorbing energy imparted thereto by a vibratory tendency of the shaft but unable to give such absorbed energy back again to increase the vibratory tendency.

7. The combination with a rotatable shaft adapted to rotate at or above its critical speed, of a medium operatively related thereto and capable of absorbing energy without being able to give such absorbed energy back again, whereby energy absorbed by said medium in a vibratory action of said shaft is not available to increase the vibratory tendency.

8. The combination with a rotatable shaft adapted to rotate at or above its critical speed, of a mass of circular laminations mounted on the shaft and held together under pressure and adapted to damp the vibration of the shaft.

9. The combination with a rotatable flexible shaft adapted to rotate at or above its critical speed, of a mass of laminations through which the shaft extends, and means for holding said laminations together under pressure whereby excessive vibration of the shaft is prevented.

10. The combination with a rotatable flexible shaft adapted to rotate at or above its critical speed and a rotor member secured thereto intermediate its ends, of a mass of laminations mounted on the shaft on each side of said rotor member, and means forcing said laminations against said rotor member whereby the laminations are held together under pressure.

11. The combination with a rotatable flexible shaft adapted to rotate at or above its critical speed and a rotor member secured thereto intermediate its ends, of a mass of laminations adjacent each side of said rotor member through which the shaft extends, and means operatively related to said shaft for forcing each of said masses of laminations against said rotor member whereby each mass of laminations is held together under pressure.

In witness whereof, I have hereunto set my hand this 6th day of October, 1914.

ERNST F. W. ALEXANDERSON.

Witnesses:
  BENJAMIN B. HULL,
  HELEN ORFORD.